United States Patent
Müller et al.

(10) Patent No.: US 12,145,014 B2
(45) Date of Patent: Nov. 19, 2024

(54) METHOD FOR MONITORING THE QUALITY OF FIRE-FIGHTING WATER IN SPRINKLER SYSTEMS, AND SPRINKLER HEAD

(71) Applicant: JOB LIZENZ GMBH & CO. KG, Ahrensburg (DE)

(72) Inventors: Bodo Müller, Tornesch (DE); Rüdiger Klug, Ahrensburg (DE); Jürgen Teschner, Hamburg (DE)

(73) Assignee: Job Lizenz GmbH (DE)

( * ) Notice: Subject to any disclaimer, the term of this patent is extended or adjusted under 35 U.S.C. 154(b) by 828 days.

(21) Appl. No.: 17/285,586

(22) PCT Filed: Oct. 8, 2019

(86) PCT No.: PCT/EP2019/077199
§ 371 (c)(1),
(2) Date: Oct. 18, 2021

(87) PCT Pub. No.: WO2020/078771
PCT Pub. Date: Apr. 23, 2020

(65) Prior Publication Data
US 2022/0054875 A1    Feb. 24, 2022

(30) Foreign Application Priority Data

Oct. 18, 2018  (DE) .................... 10 2018 125 861.5

(51) Int. Cl.
*A62C 37/50*  (2006.01)
*A62C 37/08*  (2006.01)
*G01N 27/06*  (2006.01)

(52) U.S. Cl.
CPC .............. *A62C 37/50* (2013.01); *A62C 37/08* (2013.01); *G01N 27/06* (2013.01)

(58) Field of Classification Search
None
See application file for complete search history.

(56) References Cited

U.S. PATENT DOCUMENTS 5,373,989 A  * 12/1994 Hattori ............... A62C 37/50
                                                   116/272
5,649,598 A  *  7/1997 MacDonald, III ..... A62C 35/68
                                                   169/37

(Continued)

FOREIGN PATENT DOCUMENTS

DE        2539703       7/1982
DE      102014206228   10/2015
(Continued)

*Primary Examiner* — Joseph A Greenlund
(74) *Attorney, Agent, or Firm* — Sand, Sebolt & Wernow Co., LPA

(57) ABSTRACT

A method of monitoring quality of extinguishing water in a sprinkler system by measuring electrical conductivity of the extinguishing water on at least one sprinkler head connected to an extinguishing water line. A quality and/or quality change of the extinguishing water is inferred from a measured conductivity value. A sprinkler head is disclosed that is suitable for carrying out the method. This sprinkler head has a connection fitting having a pipe section for connection to a free end of an extinguishing water pipe. A closure piece selectively closes the pipe section or free end of the extinguishing water pipe. A thermal trigger element holds the closure piece in a closed position in a normal state, and permits the closure piece to move into an open position at a trigger temperature. A conductivity sensor for measuring the electrical conductivity of the extinguishing water is provided on the sprinkler head.

8 Claims, 2 Drawing Sheets

(56) References Cited

U.S. PATENT DOCUMENTS

| | | | | |
|---|---|---|---|---|
| 6,615,927 B1* | 9/2003 | Kim | ....................... | A62C 37/14 |
| | | | | 169/42 |
| 9,199,107 B2* | 12/2015 | Kjellberg | ............... | A62C 31/07 |
| 9,579,531 B2* | 2/2017 | Müller | .................... | A62C 35/10 |
| 9,805,588 B2* | 10/2017 | Gritzo | ..................... | G08B 25/14 |
| 2006/0248961 A1* | 11/2006 | Shachar | .............. | G01P 13/0033 |
| | | | | 73/861.24 |
| 2006/0272830 A1* | 12/2006 | Fima | .................... | F24H 15/212 |
| | | | | 169/16 |
| 2013/0126194 A1* | 5/2013 | Kjellberg | ............... | A62C 31/07 |
| | | | | 169/37 |
| 2014/0332240 A1* | 11/2014 | Kochelek | ................ | A62C 35/68 |
| | | | | 169/17 |
| 2019/0083833 A1* | 3/2019 | Müller | .................... | A62C 37/04 |
| 2019/0224509 A1* | 7/2019 | Goyette | ................ | G01M 3/045 |
| 2022/0054875 A1* | 2/2022 | Müller | .................... | A62C 35/58 |

FOREIGN PATENT DOCUMENTS

| | | |
|---|---|---|
| EP | 2334384 | 3/2010 |
| WO | 2001014836 | 3/2001 |
| WO | 2013181596 | 12/2013 |
| WO | 2014182810 | 11/2014 |

* cited by examiner

METHOD FOR MONITORING THE QUALITY OF FIRE-FIGHTING WATER IN SPRINKLER SYSTEMS, AND SPRINKLER HEAD

TECHNICAL FIELD

The present invention relates to a method for monitoring the extinguishing water quality of extinguishing water located in a sprinkler system. It also relates to a sprinkler head for a sprinkler system which is suitable for carrying out such a method.

BACKGROUND

Background Information

Sprinkler systems are presently installed in various buildings, in particular public buildings. They are used for fire protection and firefighting. They typically contain a network of extinguishing water pipes connected to an extinguishing water supply, of which pipe sections having free ends are installed in the region of a building ceiling and sprinkler heads are inserted into the pipe sections. Such sprinkler heads are described, for example, in DE 25 39 703 C2. The sprinkler heads have thermal trigger elements which, when a trigger temperature is reached, cause a valve to open and extinguishing water in the extinguishing water pipe to be released through the sprinkler head and escape. The extinguishing water is available in the network of extinguishing water pipes at a predetermined pressure. The extinguishing water supply is frequently formed in the form of an extinguishing water tank that is filled with a predetermined volume of extinguishing water. However, there are also sprinkler systems in which the network of extinguishing water pipes is connected to a water supply line, for example for drinking water or service water.

Such sprinkler systems classically have an extremely long service life, during which the extinguishing water remains in the system for long periods of time without being replaced. In particular, because the free ends of the extinguishing water pipes provided with the sprinkler heads are formed as dead-end-like sections, a circulation of the extinguishing water cannot be effectuated, at least not sufficiently.

A known problem in sprinkler systems of this type is that the quality of the extinguishing water deteriorates over the service life, that biofilms, for example, grow in it or that corrosion residues and particulate contaminants accumulate due to a corrosive property of the extinguishing water. Various attempts have been made to counter this problem. According to a proposal disclosed in WO 01/14836 A1, the extinguishing water pipe system is sterilized using antimicrobial gas in order to prevent the growth of biofilms that narrow or even clog the pipe cross-sections of the extinguishing water pipes of the sprinkler system and can thus impair or even disable the function of the sprinkler system in an emergency. EP 2 334 384 B1 proposes displacing oxygen present in the extinguishing waterpipe system by introducing nitrogen gas therein and conveying the oxygen out of the system via an outlet valve to thus avoid corrosion in the pipe system and prevent the pipe system from being attacked by such corrosion and the extinguishing water located in the pipeline system from being contaminated with particles or the like, which could in turn impair or even disable the proper function of the sprinkler system in an emergency.

DE 10 2014 206 228 A1 describes a special extinguishing medium for electronic or electrical devices, which is also characterized in particular by a particularly low electrical conductivity, a value of <10 µS/cm is mentioned therein. In order to obtain the extinguishing medium in this quality, it is also proposed that it be conducted in a bypass flow via an ion exchanger and, if necessary, a particle filter. The conductivity can also be monitored here, as will be explained.

SUMMARY

While the prior art thus describes measures with which the pipeline system made up of extinguishing water pipes of a sprinkler system can be treated and the quality of the extinguishing water contained therein can be improved, there is currently no practical option for monitoring the quality of the extinguishing water located in the extinguishing water pipes of the sprinkler system, in particular in the particularly sensitive regions of the sections of the extinguishing water pipes formed as dead ends, to which the sprinkler heads are attached.

The present invention is intended to provide a remedy here by specifying a method using which such monitoring of the extinguishing water quality of extinguishing water located in a sprinkler system is possible. In addition, the invention is also intended to specify a sprinkler head for a sprinkler system, using which such a method can be carried out.

This object is achieved according to the invention by a method for monitoring the extinguishing water quality of extinguishing water located in a sprinkler system, in which a measurement of the electrical conductivity of the extinguishing water located in the sprinkler system is carried out and a quality and/or a quality change of the extinguishing water is inferred from a measured conductivity value.

This is because in the context of considerations and studies that were carried out in the course of the search for a solution for the above-described object, it was initially recognized that an essential indicator for the quality of the extinguishing water in a sprinkler system is its electrical conductivity. If the electrical conductivity of the extinguishing water in the sprinkler system changes, this indicates a quality change. Typically, an increase in electrical conductivity indicates that the extinguishing water has an increased tendency to corrode. A reduction in the electrical conductivity can indicate the presence of a substantial amount of electrically non-conductive particles in the extinguishing water. In practice, the electrical conductivity of the extinguishing water is thus measured, in particular at time intervals, in particular at periodically specified intervals, or also continuously, and a change of the measured value for the electrical conductivity is seen as an indicator of a changed quality of the extinguishing water. Typically, threshold values are set here that determine a tolerance range within which the changes in the electrical conductivity still indicate an acceptable quality of the extinguishing water, but if the changes exceed or fall below them, a change of the quality of the extinguishing water is recognized which makes necessary an intervention and further measures. Such measures can consist, for example, of treating the extinguishing water and/or the extinguishing water pipe system of the sprinkler system, as described in the prior art explained at the outset. It is also possible, for example, to exchange and completely replace the extinguishing water and/or to flush the extinguishing water pipes of the sprinkler system.

Although the focus above is on measuring the electrical conductivity, it should be made clear that, of course, it is also possible to measure the electrical resistance as an analogous measure. It is well known that electrical resistance and electrical conductivity are in a fixed relationship; the electrical resistance is proportional to the reciprocal value of the electrical conductivity. Correspondingly, a value for the electrical resistance of the extinguishing water is also an indicator of the quality of the extinguishing water, i.e., the determination of an electrical resistance is also included in the measurement of the electrical conductivity according to the invention, without requiring the conversion into the electrical conductivity as a prerequisite for this purpose.

In the method according to the invention, and this is what distinguishes the invention, the measurement of the electrical conductivity of the extinguishing water is carried out on a sprinkler head connected to an extinguishing water pipe of the sprinkler system. For this purpose, a corresponding sensor is positioned in a region of the sprinkler head in such a way that it is in contact with the extinguishing water for a measurement of the electrical conductivity. This procedure has the particular advantage that the quality of the extinguishing water located there is monitored locally, especially in the critical regions, namely the sections of the extinguishing water pipeline network formed as dead ends and at the ends of which the sprinkler heads are fastened. In these regions in particular, there is no movement of the extinguishing water, the extinguishing water stands still, and a deterioration in the quality of the extinguishing water has a particularly serious effect. To carry out the method according to the invention, it is not absolutely necessary to determine or monitor the quality of the extinguishing water in the region of every one of the sprinkler heads by means of electrical conductivity measurements carried out there. In principle, the measurement in the region of one of the sprinkler heads can already provide sufficient information about the quality of the extinguishing water located in the sprinkler system. However, if several measuring points located on different sprinkler heads are configured and the conductivity of the extinguishing water and, moreover, the quality thereof is determined and tracked at these measuring points, even better monitoring of the entire system results.

The results of the measurements carried out for the electrical conductivity, i.e., data representing the recorded measured values, are typically relayed to a control center, in which they are evaluated or by which they are further processed for an evaluation and, if necessary, transmitted still further. This control center can be, for example, a controller or a monitoring device for the sprinkler system. A transmission to the control center can in particular also take place when the measurement of the electrical conductivity of the extinguishing water is carried out on or in the region of a sprinkler head of the sprinkler system. Such a transmission of data can take place in a wired manner, if appropriate wiring is possible and provided. However, it can also take place wirelessly, at least in one transmission section.

A further aspect of the achievement of the object and thus the invention consists, as already mentioned at the outset, of a specially designed sprinkler head for a sprinkler system. According to the invention, this sprinkler head has a connection fitting, which has a pipe section, for connection to a free end of an extinguishing water pipe of the sprinkler system. It also has a closure piece which, in a closed position, closes the pipe section and/or the free end of the extinguishing water pipe in order to prevent extinguishing water from escaping from the extinguishing water pipe, and which, in an open position, releases the pipe section and the free end of the extinguishing water pipe so that extinguishing water can escape from the extinguishing water pipe and through the sprinkler head. Furthermore, it has a thermal trigger element which, in a normal state, holds the closure piece in the closed position and, at a release temperature, permits a movement of the closure piece into the open position. In this respect, the sprinkler head according to the invention still corresponds to the typical and generally known sprinkler heads, with which the sprinkler head according to the invention can also correspond in other routine details, for example by providing a distributor plate for distributing escaping extinguishing water in the surroundings around the sprinkler head and the like. The special feature of the sprinkler head according to the invention is that a conductivity sensor for measuring the electrical conductivity of the extinguishing water is provided thereon in a region in which extinguishing water is available in a state of the sprinkler head connected to the free end of the extinguishing water pipe.

Such a sprinkler head can therefore be used, in particular, to determine the electrical conductivity of the extinguishing water and thus to monitor the quality of the extinguishing water at the particularly sensitive ends of the pipe fittings that are formed as dead ends when the sprinkler system is not triggered and on which the sprinkler heads of the sprinkler system are attached. It is also particularly suitable for retrofitting existing sprinkler systems.

The thermal trigger element of a sprinkler head according to the invention can in principle be formed as desired and selected from the typical thermal trigger elements known for such components. Thermal trigger elements are to be mentioned here using a fusible material such as fusible solder, but also thermal trigger elements having bursting bodies, for example a closed so-called glass vial filled with a trigger liquid.

The sprinkler head according to the invention can advantageously have a device connected to the conductivity sensor for wireless transmission of measured values of the conductivity sensor. In such an embodiment, it is not necessary to connect the sprinkler head via data cables to read out the recorded measured values for the electrical conductivity of the extinguishing water.

The sprinkler head according to the invention can advantageously also have an electrical energy source, for example a battery or an accumulator. Such an electrical energy source can be used to supply the conductivity sensor and/or the device for wireless transmission of measured values with electrical energy, so that wiring of the sprinkler head according to the invention is also not required from the point of view of this energy supply.

Furthermore, the sprinkler head according to the invention can have a control unit which is configured to actuate the conductivity sensor to carry out a measurement of the electrical conductivity of the extinguishing water. In principle, this control unit can function as a type of slave unit, which only further processes trigger signals received from a higher-level controller operating as a master and activates the conductivity sensor for a measurement. However, it can also itself contain corresponding program sequences programmed and automatically trigger measurements of the conductivity sensor according to certain specifications, for example on the basis of predetermined time intervals, and process corresponding measured values, and/or transmit them to a control center.

BRIEF DESCRIPTION OF THE SEVERAL VIEWS OF THE DRAWINGS

Further advantages and features of the invention will become clear once again on the basis of the following description of an exemplary embodiment with reference to the accompanying figures. In the figures.

DETAILED DESCRIPTION

Figure 1:
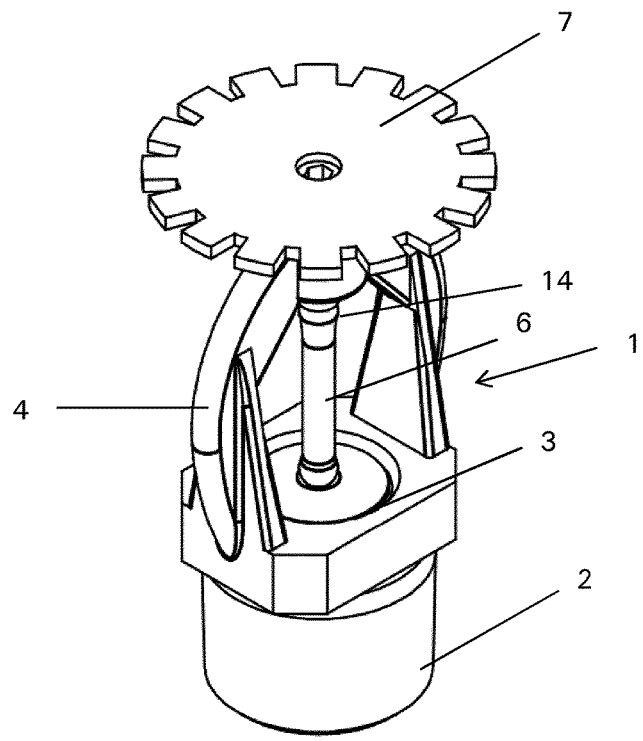
FIG. 1 shows a three-dimensional view of a sprinkler head according to the invention.
Figure 2:
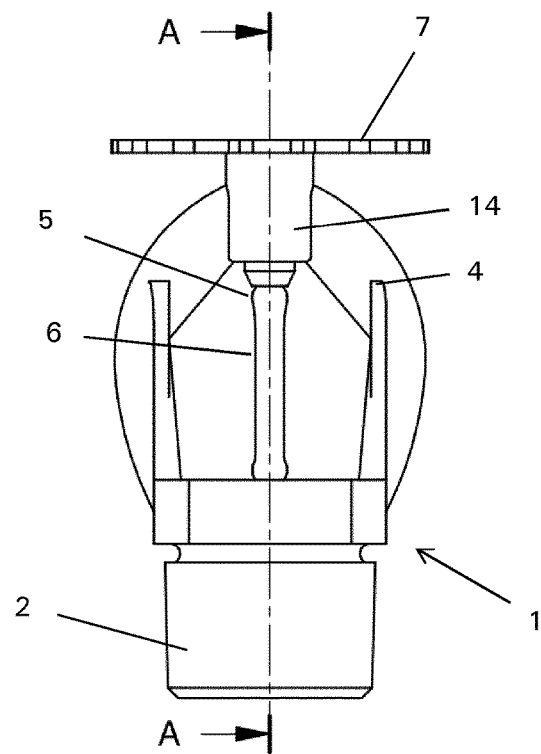
FIG. 2 shows a side view of the sprinkler head from FIG. 1.

In the figures, a sprinkler head 1 is schematically shown in different views, which is equipped according to the invention with a conductivity sensor for measuring the electrical conductivity of extinguishing water in a sprinkler system and which can be used accordingly for carrying out the method according to the invention. The sprinkler head 1 shown in the figures is only one possible example of an embodiment of a sprinkler head which is provided or equipped with a conductivity sensor in the manner according to the invention. In this respect, the details of the sprinkler head shown are only to be understood as a possible embodiment, it is clear to a person skilled in the art that he can in principle provide or equip all possible embodiments known per se of sprinkler heads according to the invention with a conductivity sensor in order to design it in the manner according to the invention.

The sprinkler head 1 shown in the figures has a connection fitting 2 which has an external thread (not shown here) using which this connection fitting 2 can be screwed into an end piece of an extinguishing water pipe of a sprinkler system that has a corresponding internal thread, in order to attach the sprinkler head 1 to the extinguishing water pipe. In the interior of the connection 2, a line section 8 is formed, into which extinguishing water can flow from the extinguishing water pipe of the sprinkler system, at the end of which the sprinkler head 1 is connected. The line section 8 is closed by a closure piece 3. A buttress 5 is connected to the connection fitting 2 via connecting arms 4 and is axially opposite the closure piece 3 at a distance. A thermal trigger element 6 is arranged between the buttress 5 and the closure piece 3, which keeps the locking piece 3 in its position closing the line section 8.

In the exemplary embodiment shown, the closure piece 3 is formed as a spring element, like a plate spring, so that when the thermal trigger element 6 is introduced between the buttress 5 and the closure piece 3, a tensioning force can be built up and, due to the spring action of the closure piece 3, the closure piece 3 can still be held securely by the thermal trigger element 6 in the position closing the line section 8 even in the event of dimension changes caused by temperature changes, for example. In an implementation according to the invention, however, other designs of the closure piece can also be implemented, wherein, for example, a spring element can also be provided separately, as is also known in principle from the prior art.

The buttress 5 is formed as an element screwed into a receptacle 14, which is fixedly connected to the connecting arms 4, so that it can be moved in the direction of the closure piece 3 by screwing into the receptacle 14 to tension the thermal trigger element 6, and can be unscrewed in the other direction for relief.

A distribution plate 7 is formed on the receptacle 14 which, in case of the sprinkler head 1 being triggered, causes distribution of the extinguishing water escaping through the line section 8 in a known manner.

In the exemplary embodiment shown, the thermal trigger element 6 is a so-called glass vial filled with a trigger liquid, as has long been known in the prior art for implementing corresponding thermal trigger elements in sprinkler heads. However, another thermal trigger element can also be used here, for example one consisting of or formed using a fusible material, for example fusible solder, as is also typical in the prior art.

Figure 3:
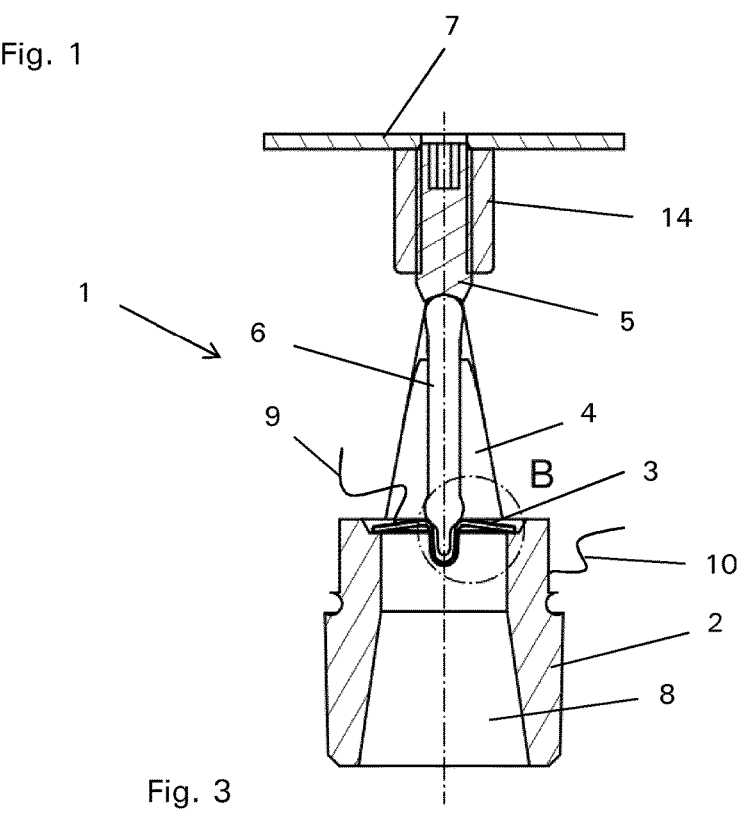
FIG. 3 shows a sectional view of the sprinkler head from FIG. 1 taken along the line of section A-A according to FIG. 2.

As schematically shown in FIG. 3, the closure piece 3, which is made of an electrically conductive material, for example a steel, and the connection fitting 2, which is also made of an electrically conductive material, for example brass, are electrically contacted via electrical contacts 9, 10 to implement a conductivity sensor. The electrical contacts 9, 10 (not shown in detail in the figure) are connected to a sensor part, via which an electrical voltage can be built up or applied between the contacts 9, 10 for the measurement of a conductivity of a medium lying between the contacts, in particular of extinguishing water available in the line section 8.

Figure 4:
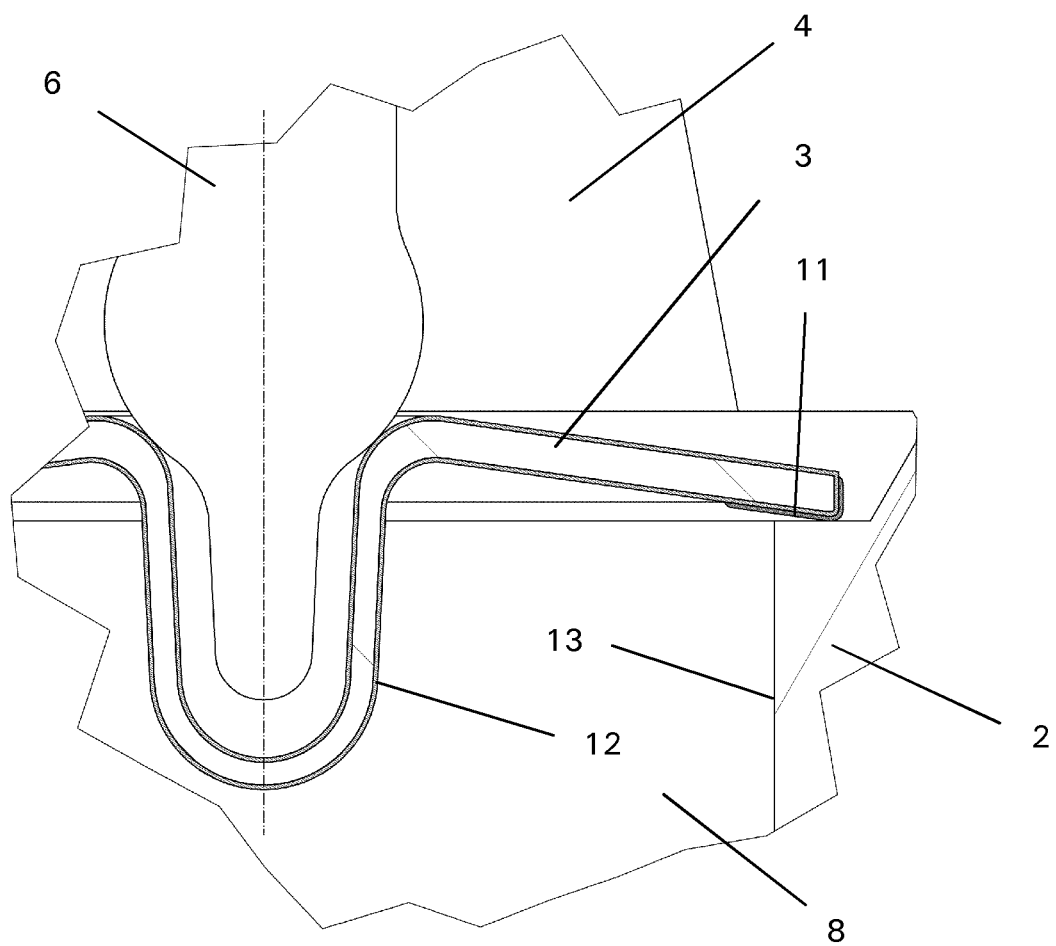
FIG. 4 shows an enlarged illustration of the detail denoted by B in FIG. 3.

FIG. 4 shows once again in greater detail how the closure piece 3 is arranged to form a seal in the line section 8. In particular, the closure piece 3 is sealed off with a seal 11 from the connection fitting 2 at an outer edge of the closure piece 3, with which it rests against a shoulder of the connection fitting 2. In FIG. 4, this seal 11 is shown as a coating on the closure piece 3. However, a different type of seal can also be provided here, for example an O-ring inserted there or the like. This seal 11, which is relevant for the structure of the conductivity sensor selected here, consists of an electrically non-conductive material, so that the closure piece 3 is galvanically isolated from the connection fitting 2 at this contact point. Since the thermal trigger element 6, which is formed here in the form of a glass vial, is also electrically non-conductive, galvanic insulation is also achieved at this connection point between the closure piece 3 and the connection fitting 2 (connected via the thermal trigger element, the buttress 5, the receptacle 14, and the connecting arms 4). Correspondingly, electrical conduction can only be established between the closure piece 3, which is in contact with a surface 12, on which the electrically conductive material is exposed, with the interior of the line section 8, in the case of the sprinkler head 1 integrated into a sprinkler system thus with the extinguishing water available therein, and the connection fitting 2 contacted via the electrical contact 10, which also has its electrically conductive material exposed on its surface 13 and is thus in contact with the extinguishing water available in the line section 8 in the installed state of the sprinkler head 1 in the sprinkler system. If a voltage is now applied between the electrical contacts 9 and 10, electrical conduction thus also occurs via the extinguishing water available in the line section 8, wherein the current flow achieved at a given voltage in the circuit thus formed is dependent on the conductivity of the extinguishing water 8, so that the measured value of the current is a measure of the conductivity (correspondingly also the electrical resistance, which can also be used as a parameter for the extinguishing water quality) of the extinguishing water. For the corresponding operation of the sensor system formed in this way and for a relay of the measurement data to a control center, corresponding devices (not shown in detail in the figures) are provided on the sprinkler head 1 according to the invention, for example on a circuit board (not shown here) arranged on the sprinkler head 1, which can then, for example, also have a radio transmitter for wireless transmission of measurement data or a data terminal and an electrical supply cable terminal for the supply of an electrical voltage, also for operating in particular the conductivity sensor formed as explained above.

If a cable terminal is to be omitted, a source for electrical energy, for example a battery or an accumulator, is also arranged on the sprinkler head 1 according to the invention, for example on the circuit board as mentioned above. In this case, a controller provided on the sprinkler head 1, which coordinates the measurements of the conductivity sensor and, if necessary, further processes the measured values obtained, can also include a device which outputs a signal if the electrical energy supply is exhausted or falls below a threshold value of the amount of energy stored which is considered as a reserve.

Using the sprinkler head 1 according to the invention and shown in the figures, a determination of the conductivity of the extinguishing water present in the line section 8 can now be carried out, for example continuously or at measurement intervals predetermined with regard to the time sequence, in order then to use the conductivity determined in this way and/or its change to assess the quality of the extinguishing water. In an evaluation, for example, a warning can be given if the extinguishing water has been recognized as impaired in its quality in such a way that it has to be treated or replaced in order to avoid or prevent impairments of the function of the sprinkler system.

REFERENCE SIGNS

1 sprinkler head
2 connection fitting
3 closure piece
4 connection arm
5 buttress
6 thermal trigger element
7 distributor plate
8 line section
9 electrical contact
10 electrical contact
11 seal
12 surface
13 surface
14 receptacle

The invention claimed is:

1. A sprinkler head for a sprinkler system comprising:
a connection fitting including a pipe section for connection to a free end of an extinguishing water pipe of the sprinkler system;
a closure piece movable between a closed position and an open position, wherein in the closed position, the closure pieces closes the pipe section and/or the free end of the extinguishing water pipe to prevent extinguishing water from escaping from the extinguishing water pipe, and wherein, in the open position, the closure piece releases the pipe section and the free end of the extinguishing water pipe, so that the extinguishing water can escape from the extinguishing water pipe and through the sprinkler head;
a thermal trigger element which, in a normal state, holds the closure piece in the closed position, and, at a trigger temperature, allows the closure piece to move into the open position; and
a conductivity sensor provided on the sprinkler head in a region in which the extinguishing water is available when the sprinkler head is connected to the free end of the extinguishing water pipe;
wherein the conductivity sensor is configured to measure electrical conductivity of the extinguishing water and a conductivity value measured by the conductivity sensor infers a quality and/or a quality change of the extinguishing water.

2. The sprinkler head according to claim 1, further comprising a device connected to the conductivity sensor for wireless transmission of measured values from the conductivity sensor.

3. The sprinkler head according to claim 1, further comprising an electrical energy source.

4. The sprinkler head according to claim 1, further comprising a control unit which is configured to actuate the conductivity sensor to carry out a measurement of the electrical conductivity of the extinguishing water.

5. A method for monitoring an extinguishing water quality of extinguishing water located in a sprinkler system, comprising:
measuring electrical conductivity of an extinguishing water located in the sprinkler system; and
inferring a quality and/or a quality change of the extinguishing water from a measured conductivity value, wherein the measurement of the electrical conductivity of the extinguishing water is carried out on at least one sprinkler head connected to an extinguishing water line of the sprinkler system.

6. The method according to claim 5, further comprising:
transmitting data representing the measured conductivity value from the at least one sprinkler head to a control center.

7. The method according to claim 6, wherein the data is transmitted wirelessly from the sprinkler head to the control center in at least one transmission section.

8. The method according to claim 5, wherein the measurement of the electrical conductivity is carried out continuously or repeatedly at predetermined intervals for continuous monitoring of the extinguishing water quality.

* * * * *